Sept. 15, 1959  J. LOVE  2,904,356
FLEXIBLE COUPLINGS FOR PIPES
Filed Aug. 3, 1956  2 Sheets-Sheet 1

Inventor
John Love
By Lucke & Lucke
Attorney

United States Patent Office 2,904,356
Patented Sept. 15, 1959

2,904,356

FLEXIBLE COUPLINGS FOR PIPES

John Love, Hillington, Glasgow, Scotland, assignor to K.A.C. Limited, Glasgow, Scotland, a British company Application August 3, 1956, Serial No. 601,887

Claims priority, application Great Britain August 3, 1955

3 Claims. (Cl. 285—226)

This invention concerns improvements in or relating to flexible couplings for pipes and the like and of the kind comprising two tubular end parts, one for connection to each of the pipes or the like (hereinafter all referred to inclusively as "pipes") to be joined, these two end parts being interconnected by a universal joint and wherein a tubular flexible intermediate member extends between the said joint from one of the said coupling end parts to the other and is fluid tightly joined to each of these parts.

In pipe couplings of the kind in question it has hitherto been proposed to connect the said coupling end parts by means of a universal joint including a gimbal ring and two sets of pivots arranged in pairs with the axes of the one pair perpendicular to those of the other pair somewhat in the manner of a Hooke's joint, and to use as the said tubular flexible intermediate member a length of convoluted or corrugated metallic tubing having opposite ends fixed and sealed respectively one to each of the said tubular end parts of the coupling so as to be aligned with, and to communicate with, the bores of these parts of the coupling, such flexible metallic tubing being arranged within the said tubular end parts and gimbal ring of the coupling and defining the fluid path from the one end part of the coupling to the other such part. One such known coupling is described in applicant's British Patent No. 627,120.

With pipe couplings such as just described, excessive turbulence is set up in the fluid passing through the coupling due to the fluid having to flow over the internal corrugations of the said tubular flexible intermediate member, and in spite of the great demand that has long existed for satisfactory flexible couplings of the kind in question, no satisfactory solution has yet been found for avoiding the said excessive turbulence and the effects thereof whilst at the same time preserving the advantages of this kind of coupling over the type using a non-metallic, e.g. rubber, intermediate member having a substantially smooth internal surface.

It is an object of the present invention to provide an improved coupling of the kind referred to but which is so designed as to provide a substantially smooth passage for fluid flowing through the coupling.

According to this invention there is provided a flexible coupling for pipes and of the kind described, in which the said tubular flexible intermediate member is arranged outside the said universal joint and is fluid tightly secured at or near its ends to the said tubular coupling end parts externally of the bores thereof, and in which the bore through the said universal joint is substantially smooth so that a substantially smooth flow path is presented throughout the length of the coupling to fluid passing therethrough.

In accordance with a further aspect of the invention there is provided a flexible coupling for pipes and of the kind described, in which the said tubular flexible intermediate member is arranged outside the universally joined portions of the said tubular end parts of the coupling and the said gimbal ring, and the bore of the latter is of substantially the same diameter as the bores of the said tubular end parts of the coupling, whereby a substantially smooth flow path is presented to fluid passing through the coupling for the whole of the time that the fluid is in the coupling.

According to a still further aspect of the invention there is provided a flexible coupling for pipes comprising a pair of tubular end parts each enlarged at their adjoining end portions to embrace a gimbal ring arranged between and within said enlarged portions of the said coupling end parts which are respectively pivoted to said gimbal ring, universal joint fashion, upon relatively perpendicular axes, said gimbal ring having an internal bore of substantially the same size and cross-sectional shape as the bores of the said end parts of the coupling, and these coupling end parts being joined together externally by a tubular flexible intermediate member in the form of a length of flexible metallic tubing surrounding the said enlarged adjoining portions of such end parts and the said gimbal ring, and such tubing being fluid tightly sealed at or near its ends to said tubular coupling end parts.

It will be appreciated that in a coupling according to this invention and using a gimbal ring in the universal joint, the gimbal ring is in contact with fluid flowing through the coupling and the space between the said tubular flexible intermediate member and the gimbal ring is filled with fluid. However, this fluid is substantially stationary and the coupling in effect presents a substantially smooth passage to the flow of fluid therethrough.

Instead of the universal joint of the coupling comprising a gimbal ring and pivot pins, each tubular end part of the coupling may have, at its inner end, a tubular part spherical portion, one of these portions of the said two end parts embracing one another to provide an axially inseparable tubular ball joint type of universal connection between the said end parts of the coupling.

Preferably the said tubular flexible intermediate member is in the form of a length of corrugated tubing or bellows bridging the said universal joint and sealed to the said tubular coupling end parts on opposite sides of said joint.

Where a gimbal ring is employed in the universal joint of the coupling the gimbal pins connecting the tubular end parts of the coupling to the gimbal ring prevent relative twisting between the end parts of the coupling and take the load when the coupling is under internal pressure. Moreover a slight degree of movement of the gimbal pins is preferably permitted, in a direction transverse to the axes of the gimbal pins, between the latter and the parts of the coupling into which they fit. Thus the gimbal pins may be rigidly carried by the enlarged adjoining portions of the said tubular end parts of the coupling and fit into slots in the gimbal ring.

Preferably the external surface of the said gimbal ring will be of part spherical form and the internal surfaces of the enlarged adjoining end portions of the tubular end parts of the coupling will be of a correspondingly shaped part spherical form so as closely to embrace the outer surface of the gimbal ring.

The inner surface of the gimbal ring is preferably slightly outwardly flared at the ends of the bore of such ring in order to provide for the substantially smooth passage of fluid from the tubular end parts of the coupling to, and through, the gimbal ring in the various possible angularly related positions of the said gimbal ring and tubular end parts of the coupling.

Since the said flexible tubular intermediate member or bellows forms the outermost member of the coupling above described, a protective covering may conveniently be provided around such member or bellows. Such protective covering may be of any desired form and may thus be, for example, a sleeve or other cover made of flexible material, preferably fireproof, such as an asbestos fabric, or, alternatively the protective covering may comprise an annular rigid or substantially rigid, e.g. a light metal, shield fixed to one of the tubular end parts of the coupling.

Various means may be adopted for securing the ends of the said tubular flexible intermediate member or bellows to the tubular end parts of the coupling on each side of the universal joint, but desirably this securement is effected in such a way that it does not impart to such member or bellows any torsional stresses which might cause its premature failure. In one convenient arrangement the ends of the said intermediate member or bellows are secured to conical surfaces carried by outwardly extending flanges on the tubular end parts of the coupling whilst in an alternative arrangement the said ends are welded to the said end parts of the coupling.

In order that this invention may more readily be understood, three embodiments of the same will now be described by way of example, with reference to the accompanying drawings, in which.

Figure 1:
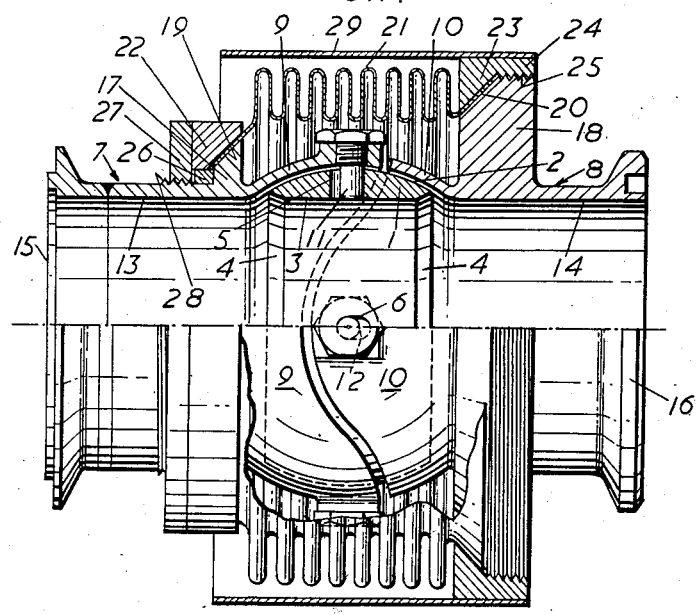
Figure 1 is in part a vertical longitudinal medial section and in part a fragmental section through a flexible pipe coupling constructed in accordance with this invention.
Figure 2:
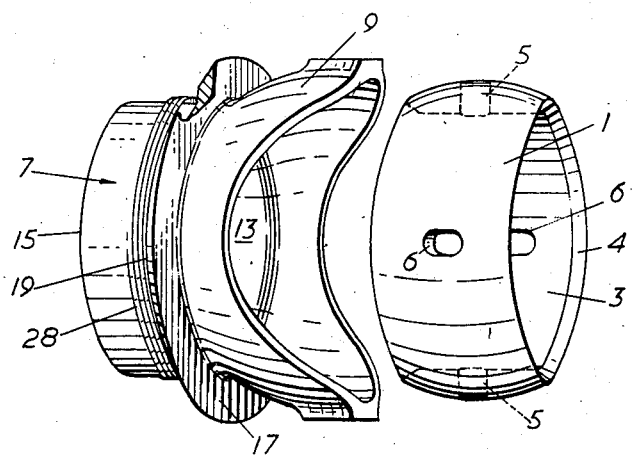
Figure 2 is a perspective view of one tubular end part and the gimbal ring of the coupling shown in Figure 1.

In the embodiment of the invention shown in Figures 1 and 2 of the drawings, the coupling comprises a tubular gimbal ring 1 which has a part-spherical outer surface 2 and a substantially cylindrical inner surface 3 defining the bore of the gimbal ring, and this bore having a slight flare 4 at each of its ends. The gimbal ring 1 is provided at diametrically spaced positions with two pairs of elongated gimbal pin receiving slots 5, 6, the direction of elongation of the holes being parallel to the axis of the cylindrical bore of the gimbal ring.

A pair of tubular end parts 7 and 8 are also provided and are of similar, but not identical, configuration. These end parts are enlarged at their adjoining or inner ends 9 and 10 to a part spherical form to receive the said gimbal ring within them and each of the parts 7 and 8 carries a pair of colinear gimbal pins respectively marked 11, 11 and 12, 12 which screw-threadedly engage with their respective coupling end parts and pass at their ends into corresponding slots 5 and 6 in the gimbal ring 1. A slight clearance is provided between the adjoining edges of the enlarged inner ends 9 and 10 of the two coupling end parts 7 and 8 to permit the said end parts to swivel about the said gimbal pins, the inner surfaces of the said enlarged inner ends of the said coupling parts fitting closely upon the outer surface of the gimbal ring 1. The junction between the inner part-spherical surface of each of the said tubular end parts of the coupling and its cylindrical bore part 13, 14 is rounded off to provide a smooth surface at this part. The cylindrical bore 3 of the gimbal ring 1 is of the same diameter as the bores 13 and 14.

Flaring the end portions 4 of the bore 3 of the gimbal ring 1 provides for the relatively smooth flow of fluid through the coupling (not shown) in all of the alternative angularly adjusted relative positions to which the end parts 7 and 8 of the coupling may be adjusted.

The outer ends 15 and 16 of the tubular end parts of the coupling are provided with any suitable means for securing the coupling to conduits, pipes or the like in a fluid tight manner.

Each of the tubular end parts 7 and 8 of the coupling has an outwardly extending peripheral flange (respectively marked 17 and 18) conveniently formed integrally therewith and the outer peripheries of these flanges are formed with conical surfaces 19 and 20 respectively.

A flexible metallic bellows 21 is arranged externally around the universal joint formed by the gimbal ring 1 and the enlarged inner end portions 9 and 10 of the coupling end parts 7 and 8, and the opposite ends of this bellows are respectively secured to the flanges 17 and 18 of the two coupling end parts 7 and 8 in a fluid-tight manner in order to seal the coupling, this securement being conveniently effected at the ends of the bellows by means of clamping rings 22 and 23 which are each provided with a conical internal surface respectively mating with the conical external surfaces 19 and 20 on the flanges 17 and 18 in order to clamp the ends of the bellows between these mating surfaces.

The clamping ring 23 has a cylindrical internally screw-threaded extension portion 24 adapted to screw on to a cylindrical corresponding screw-threaded part 25 of the flange 18, and the end of the bellows to be clamped to the flange 18 is engaged with the conical surface 20 of this flange, and clamping ring 23 is then screwed on to such flange until the end of the bellows is annularly fluid-tightly secured to the flange 18, the bellows 21 being free to rotate (should it tend to do so) as the tightening up of the clamping ring 23 is commenced.

In securing the other end of the bellows 21, it is desirable to avoid applying torsional stresses to the bellows 21, since such stresses might tend to cause failure in the bellows in due course. For this reason, the clamping ring 22 by which the said other end of the bellows 21 is clamped on to the conical surface 19 of the flange 17 on the tubular end part 7 of the coupling, is non-rotatably mounted upon the said end part of the coupling, being keyed to the latter by means of a key 26 which permits axial, but not rotational, movement of the clamping ring 22 relatively to the end part 7 of the coupling. The clamping ring 22 is tightened on to the adjacent end of the bellows 21 and towards the conical surface 19 by means of a locking ring 27 screwed on to a screw-threaded portion 28 of the end part 7 of the coupling.

To protect the bellows 21 from damage, an annular shield 29 is provided around the exterior of the bellows, this shield being conveniently carried at one end by the clamping ring 23 to which the shield may be fixed. The shield illustrated in Figure 1 is of cylindrical form and it may be made of a light weight metal, asbestos, or other suitable and preferably substantially rigid material.

It will, of course, be appreciated that, if desired, both ends of the bellows may be secured by securing means of a character such as to avoid applying torque to the bellows so that it does not matter which end of the bellows is first secured or released, and it will be appreciated that by including a conical washer secured against rotation relative to the flange 18, between the clamping ring 23 and the conical surface 20 of the flange 18 in the Figure 1 construction, avoidance of the application of torque to the bellows is achieved even if the other end of the bellows is clamped first.

Figure 3:
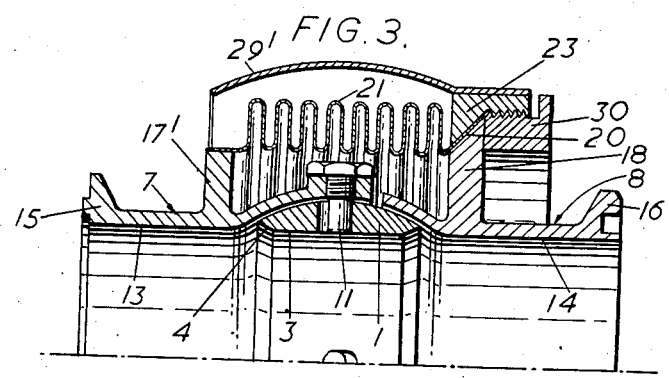
Figure 3 is a fragmentary longitudinal medial section through a modified form of the coupling shown in Figure 1.

In the embodiment of the invention illustrated in Figure 3, the construction is very similar to that shown in Figure 1 with the exception that the end of the bellows 21 secured to the end part 7 of the coupling is welded, soldered, or similarly fixed annularly to the external periphery of the flange 17' on the part 7 instead of being clamped thereto by a clamping ring as previously described. Furthermore, in this case, the shield 29 previously described is replaced by shield 29' of part spherical form, and the clamping ring 23 screws on to a locking ring 30 instead of on to the screw-threaded part 25 of the flange 18 of the construction shown in Figure 1. It will be seen that, as the locking ring 30 bears against the outer end surface of the flange 18, the clamping ring 23 is drawn firmly towards the conical surface 20 of the flange 18 as the locking ring 30 is tightened up, and the application of torque to the bellows is avoided.

It will be seen that in all the embodiments of the invention illustrated, the coupling is so formed that fluid passing therethrough does not have to flow over the corrugated internal surface of the bellows and has, on the contrary, all the way through the coupling, only to flow over a substantially smooth surface so that turbulence in the fluid flowing through the coupling is greatly reduced as compared with the coupling of the kind in question wherein the bellows is arranged within the universal joint instead of outside the latter in accordance with this invention.

It is not necessary that the two ends of the bellows should be secured to the coupling parts in the same way, but desirably the method of securement at the second end is such that no torque is applied to the bellows whilst it is being effected.

The bellows 21 is desirably made of non-corrodable metal, for example stainless steel, and may be either helically or annularly corrugated and of single or multiply form.

I claim:

1. A sealed flexible coupling for a conduit carrying fluid under pressure comprising two tubular parts, one end of each of said parts adapted to be connected to the respective ends of said conduit, the opposite ends of each of said parts provided with an enlarged outwardly flaring end having an inner part spherical surface, a gimbal ring having a part spherical outer surface fitting closely within the housing formed between said adjoining inner part spherical surfaces, a pair of rigid collinear pins pivotally connecting each of said flaring ends to said ring on perpendicular axes relative thereto to form an axially inseparable universal connection between said tubular parts, the bore of said ring having a central cylindrical portion and being outwardly flared at the ends thereof, the cylindrical bores of the cylindrical portion of said gimbal ring and said tubular parts having the same diameter as that of said conduit serving to provide a smooth, constant flow of such pressurized fluid through said coupling, an outwardly extending flange disposed on each of said parts, a metallic bellows adapted to seal said universal connection, a first means for securing one end of said bellows to the first of said flanges, a first conical surface disposed on the second of said flanges, a clamping ring provided with a second conical surface thereon complementary to said first conical surface, means to prevent relative rotation of said clamping ring disposed on the second of said flanges, the other end of said bellows being positioned between said conical surfaces, a screw-threaded second means for clamping said other end of said bellows between said conical surfaces, said clamping ring preventing torsional stress being imparted to said bellows when fluid-tight sealing said bellows about said outwardly flaring ends and a protective shield surrounding said bellows carried by one of said flanges.

2. A sealed coupling according to claim 1 wherein said first means comprises welding one end of said metallic bellows to said first flange and said second means comprises an externally threaded locking ring adapted to screw into an internally threaded portion of said clamping ring, whereby said locking ring is adapted to bear against the outer surface of said second flange and axially draw said metallic bellows between said conical surfaces without torsionally stressing said bellows to fluid-tight seal said outwardly flaring ends.

3. A sealed coupling according to claim 1 wherein said first means comprises a third conical surface on said first flange, a fourth conical surface complementary to said third conical surface on a second clamping ring, an internally threaded portion provided on said second clamping ring adapted to screw onto a correspondingly threaded portion provided on said first flange to rotatably secure the first end of said metallic bellows between said third and fourth conical surfaces, and said second means comprises a key disposed between said second flange and said first clamping ring, and said screw threaded second means comprises an internally threaded locking ring adapted to screw onto a correspondingly threaded portion of one of said tubular parts adjacent to said first clamping ring, whereby said locking ring bearing against the outer surface of said first clamping ring and said key draws said metallic bellows axially between said first and second conical surfaces without torsionally stressing said bellows to fluid-tight seal said outwardly flaring ends.

References Cited in the file of this patent

UNITED STATES PATENTS

| 406,447 | Kennedy | July 9, 1889 |
| 1,821,274 | Plummer | Sept. 1, 1931 |
| 2,451,252 | Stoeckly | Oct. 12, 1948 |

FOREIGN PATENTS

| 342,692 | Germany | May 23, 1918 |
| 227,782 | Great Britain | Mar. 26, 1925 |
| 658,066 | France | May 30, 1929 |
| 627,120 | Great Britain | July 28, 1949 |
| 692,963 | Great Britain | June 17, 1953 |